United States Patent Office 3,547,855
Patented Dec. 15, 1970

3,547,855
REMOVAL OF CATALYST RESIDUES FROM
ALPHA-OLEFIN COPOLYMER SOLUTIONS
Frederick C. Loveless, Oakland, N.J., assignor to Uniroyal, Inc., New York, N.Y., a corporation of New Jersey
No Drawing. Filed Aug. 31, 1967, Ser. No. 664,634
Int. Cl. C08f 15/40
U.S. Cl. 260—80.78       5 Claims

ABSTRACT OF THE DISCLOSURE

Alpha-olefin copolymer rubbers (EPM or EPDM) prepared in solution with soluble anionic coordination-type catalysts based on vanadium and aluminum compounds (e.g., $VOCl_3$ and $R_3Al_2X_3$), in which a nitrogen-containing oxident (e.g., nitropropane) has been used as a catalyst activator or polymerization regulator, are difficult to free from catalyst residues. Addition of certain (a) polyether diamines, or (b) polyether monoamines, or (c) mixtures of a alkanolamine with a polyether glycol, to the copolymer solution prior to water-washing and recovery of the polymer, greatly facilitates removal of the catalyst residues.

BACKGROUND OF THE INVENTION

Field of the invention

This invention relates to a method of treating a polymer solution to facilitate removal of catalyst residues therefrom.

Description of the prior art

Belgian Patent 652,313, United States Rubber Company, Aug. 21, 1964, discloses the use of certain nitrogen-containing oxidants as activators of soluble anionic coordination-type catalysts, based on vanadium and aluminum compounds in the solution copolymerization of alpha-olefins. Such activators are also used as regulators of molecular weight (see copending application Ser. No. 441,307, Garner et al., filed Mar. 11, 1965, now U.S. Pat. 3,441,546, issued Apr. 29, 1969). Removal of vanadium catalyst residues, from copolymer prepared in the presence of nitrogen-containing oxidants in such a manner, has proven to be a particularly difficult problem.

Various chemicals have been used in removing catalyst residues in other systems (e.g., U.S. Pats. 2,683,139, Leary et al., July 6, 1954; 2,886,561, Reynolds et al., May 12, 1959; 3,004,963, Bartolomeo et al., Oct. 17, 1961; 3,125,560, Rose, Mar. 17, 1964) but unfortunately no prior teaching exists, of a satisfactory way of removing catalyst residues, from a copolymer solution prepared with nitrogen-containing oxidant, as far as the present inventor is advised.

SUMMARY OF THE INVENTION

The invention involves removal of catalyst residue from an alpha-olefin copolymerization reaction mixture comprising solvent medium, copolymer, and catalyst residue from a soluble anionic coordination-type catalyst, based on a vanadium salt and an alkylaluminum halide, in which a nitrogen-containing oxidant has been used in the copolymerization to activate the catalyst and/or to regulate the molecular weight of the polymer. The invention involves adding to the mixture, at the conclusion of the polymerization, a reagent selected from the group consisting of (a) a polyether diamine
(b) a polyether monoamine, or
(c) a mixture of (i) an alkanolamine with
(ii) a polyalkylene ether glycol.

Thereafter, the treated polymerization mixture is washed with water, and subsequently the polymer is recovered from the mixture by conventional methods for example by evaporation of the solvent. The polymer treated and recovered in this manner is found to have a remarkably low content of catalyst residues, as evidenced by a low ash content, particularly by low content of aluminum remaining from the alkylaluminum halide component of the coordination catalyst and by low content of vanadium remaining from the vanadium salt component of the coordination catalyst.

The invention makes it possible to effect highly efficient removal of catalyst residues with remarkably small quantities of treating reagents, and therefore the invention affords an unusually economical solution to the problem of catalyst removal from the described polymerization solutions prepared with nitrogen-containing oxidants as activators or regulators.

PREFERRED EMBODIMENTS OF INVENTION

The invention is applicable to the manufacture of rubbery copolymers of alpha-olefins, especially copolymers of ethylene with propylene or other 1-olefins such as butene-1, pentene-1, etc., with or without a copolymerizable polyene, especially a diene, notably such non-conjugated dienes as the acyclic diolefins (e.g., 1,4-hexadiene) or the polycyclic dienes (e.g., dicyclopentadiene, cyclooctadiene, alkylidene norbornenes such as methylene norbornene, or ethylidene norbornene, or mixtures of such dienes, such as dicyclopentadiene in admixture with ethylidene norbornene, methyl tetrahydroindene, etc.). Usually the preferred rubbery copolymers contain ethylene and propylene in weight ratio of from 20:80 to 75:25 and the diene content ranges up to about 20% by weight of the polymer (usually 2 to 10%). The disclosures of U.S. Pats. 2,933,-480, Gresham et al., Apr. 19, 1960; 3,000,866, Tarney Sept. 19, 1961; 3,063,973, Gladding et al., Nov. 13, 1962; 3,093,620, Gladding et al., June 11, 1963; 3,093,621, Gladding, June 11, 1963; and 3,211,709, Adamek et al., Oct. 12, 1965, are hereby incorporated herein by reference, as teaching examples of suitable alpha-olefin copolymers to which the invention is applicable.

In conventional practice such polymerizations are carried out in an inert volatile organic solvent medium, such as n-hexane, cyclohexane, benzene, tetrachlorotheylene, etc.

The catalyst system to which the invention applies is the anionic polymerization catalyst or coordination-type catalyst based on the combination of an alkylaluminum halide (e.g., ethylaluminum sesquichloride) with a vanadium salt, preferably a vanadium halide such as vanadium oxytrichloride or vanadium tetrachloride. The mole ratio of aluminum to vanadium in the catalyst is relatively high, at least 5:1 or higher (e.g., 10:1, 20:1, 100:1, or more). Such a catalyst is of the soluble type (as distinguished from Ziegler heterogeneous catalyst), that is, it is soluble in the polymerization medium, such as hexane.

The polymerization mixtures treated in the invention are those in which a nitrogen-containing oxidant has been employed during the polymerization, for its activating effect on the catalyst and/or its regulating effect on the molecular weight of the polymer. For this purpose there may be used such nitrogen-containing oxidants as the organic nitro compounds, including for example the nitroalkanes, such as nitromethane, nitroethane, 2 - nitropropane, 1-nitropane, etc., dinitroalkanes (e.g., 3,5-dinitroheptane, 2,2-dinitropropane), trinitroalkanes (e.g., 2,2,4-trinitrohexane), and the like, nitroaryl compounds such as nitrobenzene, m-dinitrobenzene, tri nitrotroluene, etc.

Particularly preferred are the nitroalkanes, especially 2-nitropropane. Other suitable nitrogen-containing oxidizing agents include the N-oxides, whether alkyl or aryl, such as diethyldodecylamine-N-oxide, pyridine-N-oxide, dimethylaniline-N-oxide, and the like. Particularly important nitrogen-containing oxidants are the organic nitrates, nitrites and azoxy compounds, of which typical examples are such alkyl nitrates as butyl and iso-amyl nitrates, such alkyl nitrites as iso-amyl nitrite, and azoxy compounds such as azoxybenzene, bis ethyl 4,4'-azoxydibenzoate, etc. Also suitable are the nitroso compounds of which typical examples are aryl nitroso compounds such as p-nitrosodimethylaniline (also called p-dimethylaminonitrosobenzene), 4-nitrosodiphenylamine, nitrosobenzene, o-nitrosotoluene; N-nitroso-compounds such as N-nitrosoamines including N-nitrosodiphenylamine, N-nitroso-N-methylamine; N,4-dinitroso-N-methylaniline, and the like. The disclosures of the aforementioned Belgian Pat. 652,213 and application Ser. No. 441,307 (U.S. Pat. 3,441,546), as well as United States Rubber Company Belgian Pats. 652,314, Aug. 26, 1964, and 662,053, Apr. 5, 1965, and copending applications Ser. No. 441,306, filed Mar. 19, 1967 (now U.S. Pat. 3,444,149, Kelly, issued May 13, 1969) and Ser. No. 441,358 filed Mar. 19, 1967 (now U.S. Pat. 3,462,399, Matthews, issued Aug. 19, 1969), are hereby incorporated herein by reference as describing in more detail the use of nitrogen-containing oxidants employed in the present invention. Such nitrogen-containing oxidants pose a particularly serious problem in that they render virtually ineffective the conventional methods of removing catalyst residues.

It will be understood that in conventional practice the monomers to be polymerized are introduced to the polymerization medium and contacted with the catalyst to produce the polymer. Catalyst is sometimes added incrementally or continuously as the polymerization proceeds. The nitrogen-containing oxidant such as 2-nitropropane used as an activator or regulator, also may be added incrementally or continuously as the polymerization proceeds. The whole process may be on a continuous basis, with continual introduction of monomers to the reaction vessel, or a series of reaction vessels, and continual withdrawal of a product stream containing solvent, polymer, and catalyst residues. Such operating details as temperature, pressure, proportions of catalyst and oxidant, and time of polymerization, may all be in accordance with conventional practice.

The invention contemplates the addition, at the conclusion of the polymerization, of certain chemicals, with the surprising result that the catalyst residues in the polymerization reaction mixture are rendered readily removable, by washing with water, to an unusually effective extent. The chemicals used for this purpose in accordance with the invention are, as indicated previously, selected from (a) polyether diamines, (b) polyether monoamines, or (c) mixture of (i) an alkanolamine with (ii) a polyalkylene ether glycol.

In more detail, the polyether diamines (a) useful in the invention are those of the formula

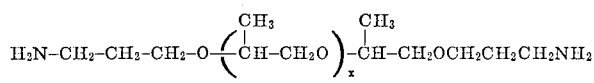

where $x$ is a number such that the molecular weight of the polyether diamine is from 200 to 2,000 or 3,000 or more.

With regard to the polyether monoamines (b) useful in the invention, these are substances of the formula

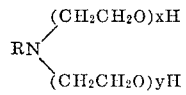

where R is a higher alkyl radical (such as stearyl or an alkyl radical of the type devised from coco, soybean, or tallow) and $x$ and $y$ are numbers such that the average molecular weight of the compound is from 200 to 1,000 or more.

The form of the invention (c) involving mixtures of (i) an alkanolamine with (ii) a polyether glycol may utilize such alkanolamines as the monoalkanolamines, for example, monoethanolamine and diethyl ethanolamine, as well as dialkanolamines, e.g., tertiary butyl diethanolamine and methyl diethanolamine. The polyether glycol (ii) is represented by such polyalkylene ether glycols as polypropylene glycol, polytetramethylene glycol, and the like. The polyether glycol usually has a molecular weight of at least 200, and may have a considerably higher molecular weight, for example, 2,000 or more.

The reagents used in the invention have at least a slight solubility in the polymer solution.

It is a remarkable feature of the invention that only a very small amount of the described chemical substances need be added to the polymer solution to render catalyst removal effective. Thus, the method of the invention is effective with as little as about 1 part by weight of treating substance, per part of vanadium salt in the polymerization mixture. Usually for optimum results it is preferred to use somewhat more of the additives (a), (b) or (c), say about 3 to 10 parts per part of vanadium compound in the polymer solution. Of course, if desired considerably larger quantities of additives, such as 15 to 20 parts per part of vanadium salt in the solution may be used if desired without ill effects but such larger quantities are ordinarily not necessary and for reasons of economy would not be used in typical practice.

When the additive takes the form (c), that is, the form of a mixture of compounds (i) and (ii), the relative proportions of (i) and (ii) with respect to each other may vary considerably, but will usually fall within the range of from 1:10 to 10:1 by weight ratio.

Especially noteworthy is the surprising synergistic cooperation, with respect to effectiveness in removing catalyst residues, between chemical (i) the alkanolamine and chemical (ii) the polyalkylene ether glycol. Thus, the combination of these two chemicals (i) and (ii) produces results far superior to what would be expected from the use of an amount of (i) alone equivalent to the weight of (i) plus (ii) and far superior to what would be expected from the use of an amount of (ii) alone equivalent to the weight of (i) plus (ii), as will appear from the working examples below.

The practice of the invention merely involves adding the described chemicals (a), (b) or (c) to the polymerization solution and mixing them in. No particular temperature conditions need be observed, and no particular time internal need be allowed for reaction between the additive and the catalyst residues in the polymerization mix.

Thereafter, the polymerization reaction product mixture containing the additive is simply washed with water in the usual manner to remove the catalyst residues and the polymer is thereafter recovered in the conventional manner, for example by evaporating the solvent. The washing with water may be accomplished in any suitable manner, for example by agitating the polymer solution in the presence of the wash water, then allowing the wash water to separate from the organic layer. Washing may be accomplished before or after removal of some of the solvent, or simultaneously with removal of solvent. Thus, a mixture of water and polymer solution at an elevated temperature and pressure may be sprayed or atomized above the surface of a body of agitated hot water, into which the polymer falls in the form of small particles which are subsequently separated from the water. Conventional antioxidants or stabilizers may be added at an appropriate stage, before or after the water washing, to preserve the polymer during the recovery and processing stages.

The recovered polymer is characterized by low ash content and low content of aluminum and vanadium. This is especially remarkable in polymer prepared with the aid of a nitrogen-containing oxidant such as 2-nitropropane as an activator and/or regulator. It will be understood that catalyst residues in the polymer are highly undesirable because they act as pro-oxidants and lead to discoloration and degradation of the polymer, if not removed.

The following examples, in which all parts are expressed by weight unless otherwise indicated, will serve to illustrate the practice of the invention in more detail.

EXAMPLE I

(A) Preparation of polymer solution

A dry, 2-liter, 3-necked flask is equipped with stirrer, thermometer, gas inlet tube, and vertical condenser mounted with a gas outlet tube which leads to a mineral oil bubble so the flow of gas can be observed. The flask is kept filled with dry argon prior to polymerization. Into this flask is introduced 700 ml. of pure n-heptane. The solvent is then saturated with ethylene and propylene with a continuous flow of 2 liters per minute of each gas for ten minutes. The gas flow is maintained at this rate during polymerization. To the saturated monomer solution is added 3.0 millimoles of $Et_3Al_2Cl_3$ in 20.1 ml. of n-heptane and 0.3 millimole of $VOCl_3$ in 12 ml. of n-heptane and polymerization begins immediately as evidenced by a rise in temperature. As soon as the $VOCl_3$ is added, immediate dropwise addition of 1.0 ml. of dicyclopentadiene and 0.9 millimole of 2-nitropropane in 60 ml. of n-heptane is begun. The rate of addition is such that addition is continuous for the course of the polymerization (30 minutes). After 30 minutes the flow of monomers is stopped and the system swept by a steady stream of argon during the sampling period.

(B) Catalyst residues after no treatment

Polymer recovered directly by evaporation from a polymer solution of the foregoing kind without any washing or other treatment to reduce catalyst residues may be analyzed for traces of aluminum and vanadium.
Found, p.p.m.[1] Al=2900; p.p.m. V=350.

(C) Catalyst residues after water wash only

A 100 ml. aliquot of the polymerization solution prepared in A is removed by a dry, argon filled pipette. The polymer solution, containing dissolved catalyst, is placed in a stainless steel blender which has been carefully dried and flushed with argon. To this is added 25 ml. of freshly boiled distilled water, also under argon. The mixture is blended for five minutes and then the layers are allowed to separate in a beaker for about 10 minutes. The top (organic) layer is carefully decanted into a glass beaker and the solvent is allowed to evaporate. The residual rubber is then analyzed for traces of aluminum and vanadium.
Found: p.p.m. Al=2100; p.p.m. V=240.

This demonstrates the high level of residual metals left by a simple water wash when the described polymerization system used.

(D) Catalyst residues after treatment with polypropylene glycol diamine and water washing An aliquot of the polymerization solution is taken as in part C, but this time to the polymer solution in the blender is added .05 gram of a commercial polypropylene glycol diamine having the formula:

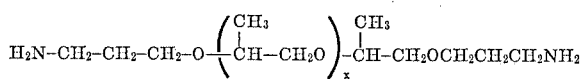

[1] Parts per million, by weight.

where $x$ is such that the molecular weight of the diamine is about 2,000. This mixture is blended under argon for 1 minute and then washed with 25 ml. degassed distilled water as previously described. Analysis of the dried rubber: p.p.m. Al=86; p.p.m. V=41.

By comparing with part C, it can be seen that a substantial reduction in metals content has taken place.

EXAMPLE II

This example shows the effectiveness of various quantities of polyether diamine employed in Example I.

Part A.—Polymerization is carried out as in part A of Example I, and treatment with the polypropylene glycol diamine is carried out as in part C of Example D, except that only .011 g. of diamine is added to the solution prior to washing.
Analysis.—p.p.m. Al=350; p.p.m. V=71.

Part B.—The procedure is exactly as in part A of this example, except that only .0055 g. of polypropylene glycol diamine is added prior to the water wash.
Analysis.—p.p.m. Al=3100; p.p.m. V=390.

From these results it can be seen that the polypropylene glycol diamine is not effective at this very low level. The results of this example and Example I are summarized in Table I.

TABLE 1

| Example | IB | IC | IIB | IIA | ID |
|---|---|---|---|---|---|
| Water wash | No | Yes | Yes | Yes | Yes |
| Amount of diamine, g | 0 | 0 | .0055 | .011 | .05 |
| Al, p.p.m | 2,900 | 2,100 | 3,100 | 350 | 86 |
| V, p.p.m | 350 | 240 | 390 | 71 | 41 |

In each case, the amount (100 ml.) of polymer solution taken for the experiment contained .0073 gram of $VOCl_3$ originally.

EXAMPLE III

This example employs the same polyether diamine as was employed in the previous examples, but also shows that the catalyst removal is effective in either the presence or absence of air.

The polymerization is identical to Example I, except that no diene is added. The rubber is therefore ethylene-propylene copolymer. Three different amounts of the polypropylene glycol diamine are added under anaerobic conditions as previously described. Also, in three more experiments, three levels of diamine are added, but this time the solution is exposed to air before and during the water wash.

| Conditions | P.p.m. Al | P.p.m. V |
|---|---|---|
| IIIA .229 g. polyether diamine—anaerobic | 105 | 29 |
| IIIB .115 g. polyether diamine—anaerobic | 110 | 20 |
| IIIC .0229 g. polyether diamine—anaerobic | 150 | 29 |
| IIID .229 g. polyether diamine—air present | 85 | 18 |
| IIIE .115 g. polyether diamine—air present | 170 | 28 |
| IIIF .0229 g. polyether diamine—air present | 59 | 14 |

As can be seen, air need not be excluded and, in fact, the presence of air seems to increase the effectiveness of the catalyst wash. This is in contrast to the prior art which repeatedly preaches the necessity for the exclusion of oxygen.

EXAMPLE IV

This example illustrates the synergistic improvement obtained by using a mixture of monoethanolamine and polypropylene glycol as treating agents, as opposed to using either one alone. The molecular weight of the polypropylene glycol employed is about 2000. The procedure is as in the previous examples, except for the treating reagents. Results are summarized in Table 2.

TABLE 2

| Amount of monoethanolamine (gram) | Amount of polypropylene glycol (gram) | Al (p.p.m.) | V (p.p.m.) |
|---|---|---|---|
| .05 | | 1,200 | 130 |
| | .05 | 840 | 140 |
| .025 | .025 | 104 | 18 |

In Table 2 we see a striking synergistic result. By using monoethanolamine (.025 gram) and polypropylene glycol (.025 gram) together in total amount of .05 gram, eminently satisfactory results are obtained, far better than would be expected from the effects of .05 gram of monoethanolamine alone which is unsatisfactory or .05 gram of polypropylene glycol alone which is unsatisfactory.

EXAMPLE V

This example illustrates the use of two different polyether diamines, identified as L–1000 and L–2000, having the formula shown in Example I. Diamine L–1000 has a molecular weight of about 1000, and contains 1.650 milliequivalents per gram of primary amine. Diamine L–2000 has a molecular weight of about 2000, and contains about 0.838 milliequivalents per gram of primary amine.

The results of a series of washing experiments (carried out as previously described) are summarized below:

| Polyether diamine | Wt. added, g. | P.p.m. Al | P.p.m. V |
|---|---|---|---|
| L–1000 | .25 | 160 | 18 |
| L–1000 | .125 | 400 | 23 |
| L–1000 | .025 | 700 | 58 |
| L–2000 | .25 | 125 | 13 |
| L–2000 | .125 | 40 | 12 |
| L–2000 | .025 | 90 | 14 |

EXAMPLE VI

This example illustrates the use of polyether mono amines for catalyst removal. The polyether mono amines have the structural formula given above and are commercially available materials, known as "Ethomeens," which may be made by condensation of fatty amines with ethylene oxide, in known manner. The commercial designation of the polyether mono amines employed, the source of the alkyl radicals (R) in the amine employed in making the polyether mono amine, and the molecular weight of the polyether mono amine, are shown in the following table. The polymerization was carried out as in Example I, and the various polyether mono amines were added to the cement prior to water washing as previously described, with the following results:

| Ethomeen | Source of alkyl radical | Average molecular weight | Grams added | P.p.m. Al | P.p.m. V |
|---|---|---|---|---|---|
| T/12 | Tallow amine | 350 | .05 | 250 | 20 |
| C/15 | Coco amine | 285 | .05 | 1,100 | 94 |
| 18/20 | Stearyl amine | 710 | .05 | 420 | 27 |
| 18/20 | Stearyl amine | 710 | .50 | 190 | 13 |

EXAMPLE VII

A mixture of .05 g. polypropylene glycol (molecular weight, 200) and .05 g. methyl diethanolamine is used as the treating substance, prior to water washing as in the previous examples. The aluminum content of the washed terpolymer is 200 p.p.m., the vanadium content 49 p.p.m.

EXAMPLE VIII

The procedure of the foregoing example is repeated, using .05 g. polypropylene glycol and .05 g. diethyl ethanolamine. The vanadium content of the washed terpolymer is 92 p.p.m.

EXAMPLE IX

The treatment of the invention is carried out in accordance with the procedure of the foregoing examples, using a mixture of .05 g. polypropylene glycol and .05 g. tertiary butyl diethanolamine. The vanadium content of the washed terpolymer is 100 p.p.m.

On the other hand, repetition of Examples VII, VIII or IX using polypropylene glycol in combination with low molecular weight amines which do not contain oxygen function, such as N-methyl bis(aminopropyl) amine or N,N-diethyl ethylenediamine, does not result in the desired lowering of the content of catalyst residues in the washed terpolymer.

EXAMPLE X

This example illustrates variations in the ratio of monoethanolamine to polypropylene glycol in the treating mixture of the invention. The procedure is as in the foregoing examples. The results are summarized in the following table:

| Example | X-A | X-B | X-C | X-D | X-E | X-F |
|---|---|---|---|---|---|---|
| Monoethanolamine, g | .075 | .025 | .05 | .05 | .05 | .05 |
| Polypropylene glycol, g | .025 | .075 | .05 | .02 | .01 | 0 |
| P.p.m. Al | 79 | 470 | 100 | 200 | 1,000 | 2,000 |
| P.p.m. V | 11 | 50 | 12 | 25 | 63 | 130 |

The reduction of the vanadium content of the terpolymer is particularly significant, since the vanadium residues are believed to be the most damaging of the catalyst residues.

EXAMPLE XI

Example I is repeated, except that instead of using 2-nitropropane as the nitrogen-containing oxidant to activate or regulate the terpolymerization, there is employed either nitrobenzene (A) or bis ethyl 4,4'-azoxydibenzoate (B), with the results shown in the following table:

| Example | A | B | C | D | E | F | G | H | I |
|---|---|---|---|---|---|---|---|---|---|
| Oxidant | A | A | A | A | A | B | B | B | B |
| Polyether diamine (L–2000), g | 0 | .1 | .05 | 0 | 0 | 0 | .1 | .05 | .025 |
| Monoethanolamine, g | 0 | 0 | 0 | .05 | .025 | 0 | 0 | 0 | 0 |
| Polypropylene glycol, g | 0 | 0 | 0 | .05 | .025 | 0 | 0 | 0 | .025 |
| P.p.m. Al | 7,800 | 500 | 470 | 270 | 450 | 4,200 | 1,100 | 94 | 230 |
| P.p.m. V | 540 | 63 | 82 | 51 | 90 | 210 | 23 | 20 | 55 |

It can be seen that both of the nitrogen-containing oxidants used in this example hinder catalyst removal, but nevertheless the use of the reagents taught herein greatly reduces catalyst residues of the water-washed polymer.

EXAMPLE XII

This example, carried out in accordance with the procedure of Example I, illustrates the use of polybutylene glycol (molecular weight 400), in combination with monoethanolamine.

| Example | XII-A | XII-B |
|---|---|---|
| Monoethanolamine, g | .05 | .025 |
| Polybutylene, g | .05 | .025 |
| P.p.m. Al | 700 | 670 |
| P.p.m. V | 80 | 67 |

EXAMPLE XIII

This example illustrates the use of diethanolamine with either polypropylene glycol (molecular weight 2000) or polybutylene glycol (molecular weight 2000). The procedure of the foregoing examples is employed, with the results shown in the table.

| Example | XIII-A | XIII-B | XIII-C | XIII-D |
|---|---|---|---|---|
| Diethanolamine, g | .05 | .025 | .05 | .025 |
| Polypropylene glycol, g | .05 | .025 | 0 | 0 |
| Polybutylene glycol, g | 0 | 0 | .05 | .025 |
| P.p.m. Al | 62 | 720 | 300 | 2,200 |
| P.p.m. V | 8 | 64 | 32 | 150 |

Having thus described my invention, what I claim and desire to protect by Letters Patent is:

1. In a method of making an alpha-olefin copolymer wherein
   (A) two different copolymerizable alpha-olefins are contacted, while dissolved in an inert volatile organic solvent medium, with a catalyst soluble in said medium comprising a vanadium salt and an alkylaluminum halide, the said medium also containing a nitrogen-containing oxidant as an activator and polymerization regulator, said nitrogen-containing oxidant being selected from the group consisting of nitroalkanes, nitroaryl-compounds, alkyl N-oxides, aryl N-oxides, organic nitrates, organic nitrites, azoxy compounds, aryl nitroso compounds and N-nitrosoamines,
   (B) the resulting copolymer solution is thereafter washed with water to remove catalyst residues, and
   (C) the copolymer is thereafter recovered from the solution by volatizing the solvent,
the improvement comprising:
   (D) adding to the copolymer solution prior to said water washing step (B), a reagent selected from the group consisting of
      (a) a polyether diamine having a molecular weight of 200–3,000,
      (b) a polyether monoamine having a molecular weight of 200–1,000, and
      (c) a mixture of
         (i) an alkanolamine with
         (ii) a polyalkylene ether glycol having a molecular weight of 200–2,000.

2. A method as in claim 1 in which there is also present in step (A) a copolymerizable diene, whereby an unsaturated, sulfur-vulcanizable terpolymer rubber is formed.

3. A method as in claim 1 in which the polyether diamine (a) has the formula:

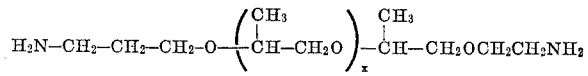

where $x$ is a number such that the molecular weight of the polyether diamine is at least 200.

4. A method as in claim 1 in which the polyether monoamine (b) has the formula:

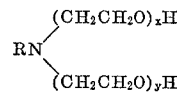

where R is a higher alkyl radical and $x$ and $y$ are numbers such that the molecular weight of the polyether monoamine is at least 200.

5. A method as in claim 1 in which the nitrogen-containing oxidant used as an activator or regulator is 2-nitropropane.

References Cited
UNITED STATES PATENTS
| 3,219,648 | 11/1965 | Hill | 260—93.7 |
| 3,219,651 | 11/1965 | Hill | 200—94.9 |
| 3,219,652 | 11/1965 | Hill | 260—94.9 |
| 3,341,503 | 9/1967 | Paige | 260—80.78 |

JOSEPH L. SCHOFER, Primary Examiner

R. S. BENJAMIN, Assistant Examiner

U.S. Cl. X.R.

260—88.2